(12) United States Patent
Levin (10) Patent No.: US 9,640,607 B2
(45) Date of Patent: May 2, 2017

(54) DIE INCLUDING A HIGH VOLTAGE CAPACITOR

(71) Applicant: Tower Semiconductor Ltd., Migdal Haemek (IL)

(72) Inventor: Sharon Levin, Haifa (IL)

(73) Assignee: TOWER SEMICONDUCTOR LTD., Migdal Haemek (IL)

( * ) Notice: Subject to any disclaimer, the term of this patent is extended or adjusted under 35 U.S.C. 154(b) by 0 days.

(21) Appl. No.: 14/637,432

(22) Filed: Mar. 4, 2015

(65) Prior Publication Data
US 2016/0260796 A1 Sep. 8, 2016

(51) Int. Cl.
*H01L 27/01* (2006.01)
*H01L 49/02* (2006.01)
(Continued)

(52) U.S. Cl.
CPC .......... *H01L 28/75* (2013.01); *G06F 17/5081* (2013.01); *H01L 23/5223* (2013.01);
(Continued)

(58) Field of Classification Search
CPC . H01L 27/0288; H01L 27/0629; H01L 28/40; H01L 28/60
See application file for complete search history.

(56) References Cited

U.S. PATENT DOCUMENTS 4,628,405 A * 12/1986 Lippert .................. H01L 28/40
257/532
5,187,637 A 2/1993 Embree
(Continued)

FOREIGN PATENT DOCUMENTS

EP 2720236 A1 4/2014

*Primary Examiner* — Jerome Jackson, Jr.
(74) *Attorney, Agent, or Firm* — Reches Patents (57) ABSTRACT

According to an embodiment of the invention there may be provided a die that may include a first capacitor layer that comprises (a) a first capacitor conductive plate, and (b) a first capacitor layer dielectric material that partially surrounds the first capacitor conductive plate; a first conductor; an intermediate metal layer that comprises (a) an intermediate metal layer conductor that is made of Copper, and (b) an intermediate metal layer dielectric material that partially surrounds the intermediate metal layer conductor; wherein the first conductor is positioned between a substrate of the die and the intermediate metal layer; a redistribution layer that comprises (a) a redistribution layer conductor that is electrically coupled to an interface pad of the die, (b) a second capacitor conductive plate, and (c) a redistribution layer dielectric material that partially surrounds the redistribution layer conductor and the second capacitor conductive plate; wherein a certain portion of the intermediate metal layer dielectric material is positioned between the first and second capacitor conductive plates; wherein at least the certain portion of the intermediate metal layer dielectric material, the first capacitor conductive plate and the second capacitor conductive plate form a high voltage capacitor; and wherein the intermediate metal layer conductor is configured to supply power to a group of transistors of the die while the first conductor is configured to supply power only to a sub-group of the transistors of the die.

6 Claims, 7 Drawing Sheets

(51) Int. Cl.
*G06F 17/50* (2006.01)
*H01L 27/06* (2006.01)
*H01L 23/522* (2006.01)

(52) U.S. Cl.
CPC ...... *H01L 27/0635* (2013.01); *G06F 2217/06* (2013.01); *G06F 2217/78* (2013.01)

(56) References Cited

U.S. PATENT DOCUMENTS

| | | | |
|---|---|---|---|
| 6,794,700 B1* | 9/2004 | Beach | H01L 27/0805 257/296 |
| 7,413,947 B2 | 8/2008 | Larkin et al. | |
| 2010/0059851 A1* | 3/2010 | Ellis | H01L 27/0629 257/500 |
| 2014/0097516 A1 | 4/2014 | Dubois | |
| 2015/0044848 A1* | 2/2015 | Bonifield | H01L 27/0288 438/381 |
| 2015/0333055 A1* | 11/2015 | West | H01L 27/0629 257/306 |

* cited by examiner

Designing a die that comprises a first capacitor layer that comprises (a) a first capacitor conductive plate, and (b) a first capacitor layer dielectric material that partially surrounds the first capacitor conductive plate; a first conductor; an intermediate metal layer that comprises (a) an intermediate metal layer conductor that is made of Copper, and (b) an intermediate metal layer dielectric material that partially surrounds the intermediate metal layer conductor; wherein the first conductor is positioned between a substrate of the die and the intermediate metal layer; a redistribution layer that comprises (a) a redistribution layer conductor that is electrically coupled to an interface pad of the die, (b) a second capacitor conductive plate, and (c) a redistribution layer dielectric material that partially surrounds the redistribution layer conductor and the second capacitor conductive plate; wherein a certain portion of the intermediate metal layer dielectric material is positioned between the first and second capacitor conductive plates; wherein at least the certain portion of the intermediate metal layer dielectric material, the first capacitor conductive plate and the second capacitor conductive plate form a high voltage capacitor; and wherein the intermediate metal layer conductor is configured to supply power to a group of transistors of the die while the first conductor is configured to supply power only to a sub-group of the transistors of the die. 610

Setting a thickness of the intermediate metal layer regardless of any electrical parameter of the high voltage capacitor. 611

Determining the thickness of the intermediate metal layer in response to a power consumed by the group of transistors. 612

DIE INCLUDING A HIGH VOLTAGE CAPACITOR

BACKGROUND OF THE INVENTION

A high voltage power management integrated circuit (PMIC) requires a unique layout and design techniques in order to transmit control signals from a low voltage regime to the high voltage domain and vice versa. This is especially acute when the high voltages are of the order of thousands of volts on the edge or beyond what silicon can sustain.

Signal transmission across high voltage isolation can be materialized by optical, inductive or capacitive or direct link via a high voltage device. At high voltages, where a direct device link may not be possible or desirable, the capacitive solution are usually simpler than the others but often used requires an off-chip high voltage cap that is expensive and bulky.

SUMMARY

According to an embodiment of the invention there may be provided a die that may include a die that may include a first capacitor layer that may include (a) a first capacitor conductive plate, and (b) a first capacitor layer dielectric material that partially surrounds the first capacitor conductive plate; a first conductor; an intermediate metal layer that may include (a) an intermediate metal layer conductor that may be made of Copper, and (b) an intermediate metal layer dielectric material that partially surrounds the intermediate metal layer conductor; wherein the first conductor may be positioned between a substrate of the die and the intermediate metal layer; a redistribution layer that may include (a) a redistribution layer conductor that may be electrically coupled to an interface pad of the die, (b) a second capacitor conductive plate, and (c) a redistribution layer dielectric material that partially surrounds the redistribution layer conductor and the second capacitor conductive plate; wherein a certain portion of the intermediate metal layer dielectric material may be positioned between the first and second capacitor conductive plates; wherein at least the certain portion of the intermediate metal layer dielectric material, the first capacitor conductive plate and the second capacitor conductive plate form a high voltage capacitor; and wherein the intermediate metal layer conductor may be configured to supply power to a group of transistors of the die while the first conductor may be configured to supply power only to a sub-group of the transistors of the die.

The die may include complementary metal oxide transistors, bipolar transistor and double diffused metal oxide transistors.

The first capacitor layer may be a first metal layer; wherein the first capacitor conductive plate may be made of metal; and wherein the first capacitor layer dielectric material partially surrounds the first conductor.

The first capacitor layer may be positioned between the substrate of the die and the first conductor and wherein the first capacitor conductive plate may include a non-metal conductive material.

The non-metal conductive material may be silicide.

The thickness of the intermediate metal layer exceeds 30000 Angstrom.

The ratio between a thickness of the intermediate metal layer and a thickness of the first capacitor layer exceeds three.

The thickness of the intermediate metal layer may be dictated by a power consumption of the group of transistors.

The thickness of the intermediate metal layer may be set regardless of any electrical parameter of the high voltage capacitor.

The die may be manufactured by a manufacturing process that may include applying a design rule that dictates a thickness of the intermediate metal layer as a function of a power consumed by the group of transistors.

The die may be manufactured by a manufacturing process that may include applying a design rule that dictates a thickness of the intermediate metal layer regardless of any electrical parameter of the high voltage capacitor.

The die may be manufactured by a complementary metal oxide (CMOS), bipolar and double diffused metal oxide (DMOS) manufacturing process.

According to an embodiment of the invention there may be provided a method for manufacturing a die, the method may include: manufacturing a substrate and a group of transistors; manufacturing a first capacitor layer that may include (a) a first capacitor conductive plate, and (b) a first capacitor layer dielectric material that partially surrounds the first capacitor conductive plate; manufacturing an intermediate metal layer that may include (a) an intermediate metal layer conductor that may be made of Copper, and (b) an intermediate metal layer dielectric material that partially surrounds the intermediate metal layer conductor; wherein the manufacturing of the intermediate metal layer may be preceded by manufacturing a first conductor; manufacturing a redistribution layer that may include (a) a redistribution layer conductor that may be electrically coupled to an interface pad of the die, (b) a second capacitor conductive plate, and (c) a redistribution layer dielectric material that partially surrounds the redistribution layer conductor and the second capacitor conductive plate; wherein a certain portion of the intermediate metal layer dielectric material may be positioned between the first and second capacitor conductive plates; wherein at least the certain portion of the intermediate metal layer dielectric material, the first capacitor conductive plate and the second capacitor conductive plate form a high voltage capacitor; and wherein the intermediate metal layer conductor may be configured to supply power to a group of transistors of the die while the first conductor may be configured to supply power only to a sub-group of the transistors of the die.

The manufacturing of the die may include applying a design rule that dictates a thickness of the intermediate metal layer as a function of a power consumed by the group of transistors.

The manufacturing of the die may include applying a design rule that dictates a thickness of the intermediate metal layer regardless of any electrical parameter of the high voltage capacitor.

According to an embodiment of the invention there may be provided a method for designing a die, the method may include: designing a die that may include a first capacitor layer that may include (a) a first capacitor conductive plate, and (b) a first capacitor layer dielectric material that partially surrounds the first capacitor conductive plate; a first conductor; an intermediate metal layer that may include (a) an intermediate metal layer conductor that may be made of Copper, and (b) an intermediate metal layer dielectric material that partially surrounds the intermediate metal layer conductor; wherein the first conductor may be positioned between a substrate of the die and the intermediate metal layer; a redistribution layer that may include (a) a redistribution layer conductor that may be electrically coupled to an interface pad of the die, (b) a second capacitor conductive plate, and (c) a redistribution layer dielectric material that partially surrounds the redistribution layer conductor and the second capacitor conductive plate; wherein a certain portion of the intermediate metal layer dielectric material may be positioned between the first and second capacitor conductive plates; wherein at least the certain portion of the intermediate metal layer dielectric material, the first capacitor conductive plate and the second capacitor conductive plate form a high voltage capacitor; and wherein the intermediate metal layer conductor may be configured to supply power to a group of transistors of the die while the first conductor may be configured to supply power only to a sub-group of the transistors of the die; and wherein the designing may include at least one out of: setting a thickness of the intermediate metal layer regardless of any electrical parameter of the high voltage capacitor; and determining the thickness of the intermediate metal layer in response to a power consumed by the group of transistors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The terms "high voltage" and "low voltage" refer to different levels of voltage. Low voltage usually refers to voltages that may not exceed few volts (for example—5 volts and below). High voltage usually refers to voltages that exceed few hundred volts (for example—200 volts and above)—and may exceed thousands of volts.

The terms "high power" and "low power" refer to different levels of power. Low power usually refers to power levels that do not exceed 1 Watt while high power usually refers to power level that exceeds 10 Watt.

The terms "thick" and "thin" refer to different levels of thickness. Thin usually refers to a thickness that does not exceed 10000 Angstrom and usually ranges between 5500 and 8500 Angstrom. Thick usually refers to thicknesses of few tens of thousands Angstrom and usually may exceed 30000 Angstrom.

According to an embodiment of the invention there is provided a method that allows integrating a high voltage capacitor in an existing manufacturing process that incorporates a thick metal layer without any added cost.

Three prior art dies (low voltage control die, level shifting dies and high voltage control circuit die) can be replaced by a double die solution (integrated HV cap and HV circuit) or single die solution when used on SOI wafers.

Figure 1:
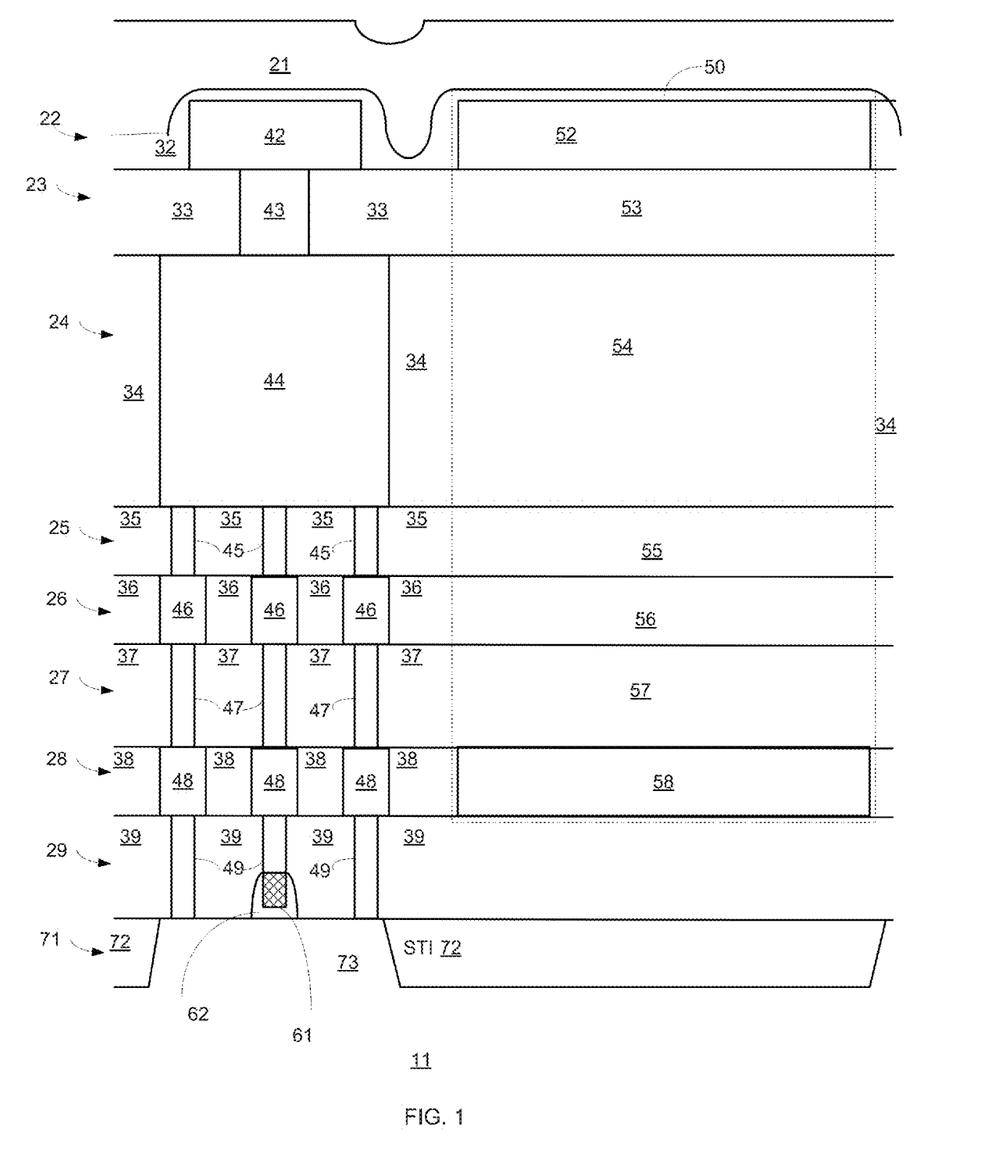
FIG. 1 is a cross sectional view of a die according to an embodiment of the invention.

FIG. 1 is a cross sectional view of a die 11 according to an embodiment of the invention.

Table 1 illustrates the layers of the die—from top to bottom, and their components:

| Layer | Elements of the layer | Part of high voltage capacitor 50 |
|---|---|---|
| First layer 21 | First layer dielectric material | |
| Second layer 22 | RDL conductor 42, first capacitor conductive plate 52, RDL dielectric material 32 (also referred to as second passivation layer) | First capacitor conductive plate 52 |
| Third layer 23 | Dielectric material 33 (also referred to as first passivation layer), via 43. | At least portion 53 of dielectric material 33 |
| Fourth layer (also referred to as intermediate metal layer) 24 | Intermediate metal layer conductor 44 that is partially surrounded by intermediate metal layer dielectric material 34 | At least portion 54 of intermediate metal layer dielectric material 34 |
| Fifth layer 25 | Vias 45 that are partially surrounded by fifth layer dielectric material 35 | At least portion 55 of fifth layer dielectric material 35 |
| Sixth layer 26 | Metal conductors 46 that are partially surrounded by sixth layer dielectric material 36 | At least portion 56 of sixth layer dielectric material 36 |
| Seventh layer 27 | Vias 47 that are partially surrounded by seventh layer dielectric material 37 | At least portion 57 of seventh layer dielectric material 37 |
| Eighth layer (also referred to as first capacitor layer) 28 | Metal conductors 48 and second capacitor conductive plate 58 that are partially surrounded by first capacitor layer dielectric material 38 | Second capacitor conductive plate 58 |
| Ninth layer 29 | Vias 49 and a transistor 62 | |

| Layer | Elements of the layer | Part of high voltage capacitor 50 |
|---|---|---|
| Substrate 71 | that includes a polysilicon region 61, vias 49 and transistor 62 are partially surrounded by ninth layer dielectric material 39 Substrate 73 is illustrated as including shallow trenches insulator (STI) 72. | |

In FIG. 1 the first capacitor layer is a metal layer and the second capacitor conductive plate is made of metal.

The different layers 21-29 are manufacture done after the other.

PMICs that are designed for high currents spreading from 1 A to 20 A need to have thick metal layers that can support the current density needed at the source and drain of high power transistors without too much area penalty.

Intermediate metal layer 24 is a thick metal layer that includes one or more thick conductors (such as intermediate metal layer conductor 44) that has a reduced resistance thereby improving the power efficiency of the die.

The intermediate metal layer conductor 44 may be coupled in parallel to multiple transistors via multiple thin metal conductors.

Intermediate metal layer 24 is termed "intermediate" because it is positioned between first and second conductive plates of the high voltage capacitor.

Intermediate metal layer 24 includes intermediate metal layer dielectric material 34 that is thick. The thickness of the intermediate metal layer dielectric material 34 may be dictated by the thickness of the intermediate metal layer conductor 44—which may dictated by the current that should be supplied by the intermediate metal layer conductor 44 and may be determined regardless of any parameter of the high voltage capacitor 50.

Accordingly—the manufacturing of the high voltage capacitor 50 does not require to modify an existing manufacturing process (for example—by artificially thickening the thickness of one or more layer) as it may utilize the thick intermediate metal layer dielectric material.

The intermediate metal layer conductor 44 can be made of Copper (Cu) and have a sheet resistance 5.5 Mega Ohm/square unit which is much smaller than the sheet resistance of conductors of thin metal layers.

The intermediate metal layer conductor 44 may be manufactured by a Copper process that may start with depositing a thick dielectric stack followed by a photo/etch process to form trenches for the metal wires. A seed layer is deposited over the dielectric and in the trenches, following the trenches may be filled by a standard electroplating technique.

According to an embodiment of the invention the high voltage capacitor 50 is able to withstand very high voltages, it is linear (in between two metal plates) with low parasitic capacitance to the substrate.

In comparison to conventional level-up shifter which dissipates power on each switching cycle, using a high-power capacitor burns much less power to send the signals.

Using a high-power capacitor provides a relatively simple way for level-down shifting without the need for high side ldmos transistors. This can save the overhead the designer has to keep in the dead time zone in the lack of down shifter. As a result the power switching efficiency can improve. Without the level shift down it is an open loop, the designer has to guess when the high side switch is turned off before turning on the low side switch. As a result the designer will use longer dead time in between switches which correlates to more power losses in each cycle.

FIG. 1 illustrates:
a. Via 42 as being connected between RDL conductor 42 and intermediate metal layer conductor 44.
b. Three vias 45 of fifth layer 25—wherein each via is connected between intermediate metal layer conductor 44 and a metal conductor out of the three metal conductors 46 of sixth layer 26.
c. Three vias 47 of seventh layer 27—wherein each via is connected between a metal conductor out of the three metal conductors 46 of sixth layer 26 and a metal conductor out of the three metal conductors 48 of eighth layer 28.
d. Three vias 49 of ninth layer 27—wherein each via is connected, at one end to a metal conductor out of the three metal conductors 46 of eighth layer 28. The other ends of two vias of the ninth layers are connected to substrate 73 while another end of a via 49 is connected to transistor 62.

The number of vias and conductors per layer may differ from those illustrated in FIG. 1.

Figure 2:
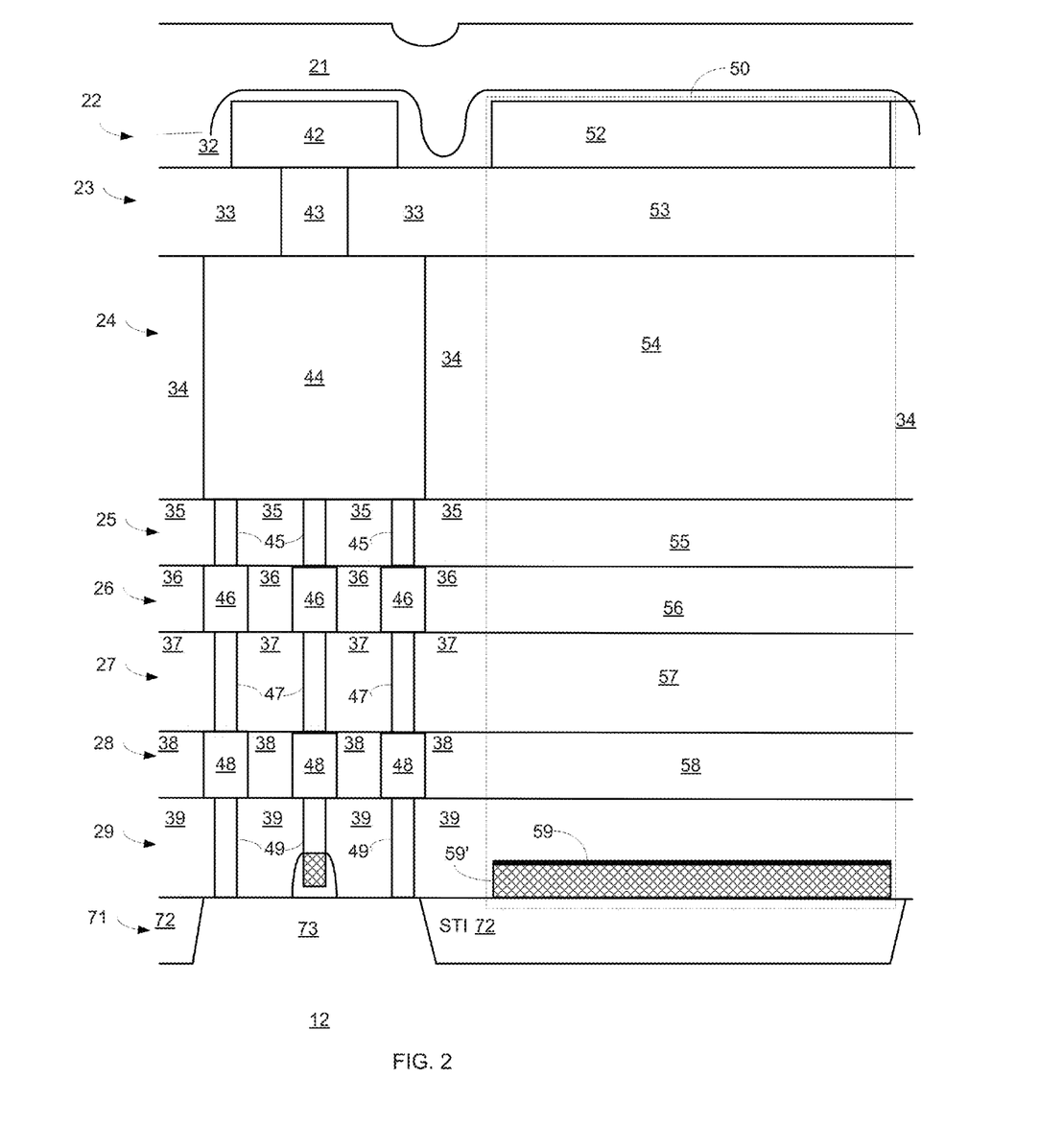
FIG. 2 is a cross sectional view of a die according to an embodiment of the invention.

Some of the thin metal conductors of thin metal layers may be used for routing logic and analog circuits of the die. FIGS. 1 and 2 illustrate two thin metal layers referred to as sixth layer 26 and eighth layer 28. The number of thin metal layers may differ from two. It may be one or exceed two.

FIG. 1 is a cross section along a certain plane. The intermediate metal layer conductor 44 is also coupled to multiple thin conductors and vias that are positioned outside of the plane—and extend "outside" FIG. 1.

Figure 7:
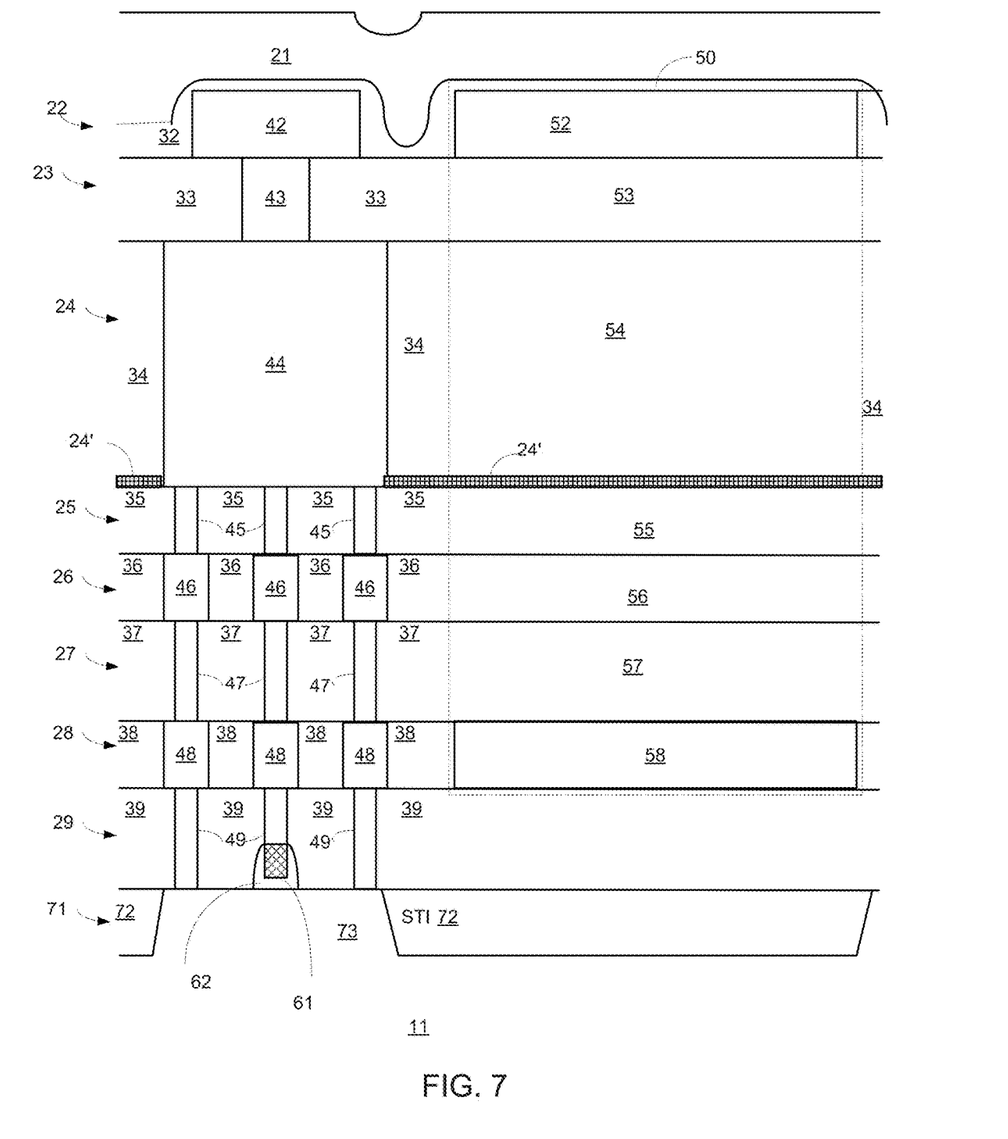
FIG. 7 is a cross sectional view of a die according to an embodiment of the invention.

The die may include a thin etch stopping layer of SiN4 having a thickness of about 500 Angstrom. FIG. 7 illustrates such an etch stopping layer (21'). Such an etch stopping layer may also be included in the die of FIG. 2.

The third layer 23 maybe a thick passivation layer of ~350 nm. The thick passivation layer may be opened for pad opening and for via 43.

The RDL conductor 42 can be made of 12000 Angstrom Aluminum that is deposited over a 50 nm Ta barrier layer. The Ta is first deposited as a barrier followed by a deposition of Al of the RDL). The Aluminum may be patterned to be used for pad areas and as redistribution (RDL) layer.

The RDL layer may be used in the integrated circuits for:
a. Conducting layer for routing devices.
b. Top plate for the HV capacitor.
c. Pad for wire bonds.

The second passivation layer 32 may be made of 350 nm SiO2 and 450 nm SIN.

The first layer 21 may be a thick polyimide layer. This thick polyimide layer helps to prevent voltage spikes between boding wires and also relieve the electric fields and get higher voltage blocking from the high voltage capacitor.

Non-limiting examples of the thickness of various layers are provided below:
a. Third layer 23—about 5000 Angstrom.
b. Intermediate metal layer 24—about 35000 Angstrom.
c. Fifth layer 25—about 8000 Angstrom.
d. Sixth layer 26—about 5500 Angstrom.
e. Seventh layer 27—about 8000 Angstrom.
f. Eighth layer 28—about 5500 Angstrom.
g. Ninth layer 29—about 5000 Angstrom.

The high voltage capacitor 50 is able to work continually at DC levels of about 200~1000V and can withstand short voltage spikes in the order of 6 KV.

As a rule of thumb—assuming that the distance (in microns) between the capacitor conductive plates is D then the high voltage capacitor may work continually at DC levels of D*100 Volts and may withstand short pulses of up to D*1000 Volts.

FIG. 2 is a cross sectional view of a die 11 according to an embodiment of the invention.

In FIG. 2 the first capacitor layer is a dielectric layer (ninth layer 29) and the second capacitor conductive plate is made of a non-metal conductive material such as silicide 59 deposited on polysilicon 59'.

Table 1 illustrates the layers of the die—from top to bottom, and their components:

| Layer | Elements of the layer | Part of high voltage capacitor 50 |
|---|---|---|
| First layer 21 | First layer dielectric material | |
| Second layer 22 | RDL conductor 42, first capacitor conductive plate 52, RDL dielectric material 32 (also referred to as second passivation layer) | First capacitor conductive plate 52 |
| Third layer 23 | Dielectric material 33 (also referred to as first passivation layer), via 43. | At least portion 53 of dielectric material 33 |
| Fourth layer (also referred to as intermediate metal layer) 24 | Intermediate metal layer conductor 44 that is partially surrounded by intermediate metal layer dielectric material 34 | At least portion 54 of intermediate metal layer dielectric material 34 |
| Fifth layer 25 | Vias 45 that are partially surrounded by fifth layer dielectric material 35 | At least portion 55 of fifth layer dielectric material 35 |
| Sixth layer 26 | Metal conductors 46 that are partially surrounded by sixth layer dielectric material 36 | At least portion 56 of sixth layer dielectric material 36 |
| Seventh layer 27 | Vias 47 that are partially surrounded by seventh layer dielectric material 37 | At least portion 57 of seventh layer dielectric material 37 |
| Eighth layer 28 | Metal conductors 48 is partially surrounded by eight layer dielectric material 38 | |
| Ninth layer (also referred to as first capacitor layer) 29 | Vias 49, a transistor 62 that includes a polysilicon region 61, and second capacitor conductive plate 59' (such as a silicide layer form on top of polysilicon layer 59), wherein vias 49, transistor 62 and second capacitor conductive plate 59' are partially surrounded by ninth layer dielectric material 39. The polysilicon layer 59 contacts the STI 72 of substrate 71. | Second capacitor conductive plate 59' |
| Substrate 71 | Substrate 73 is illustrated as including STI 72. | |

Figure 3:
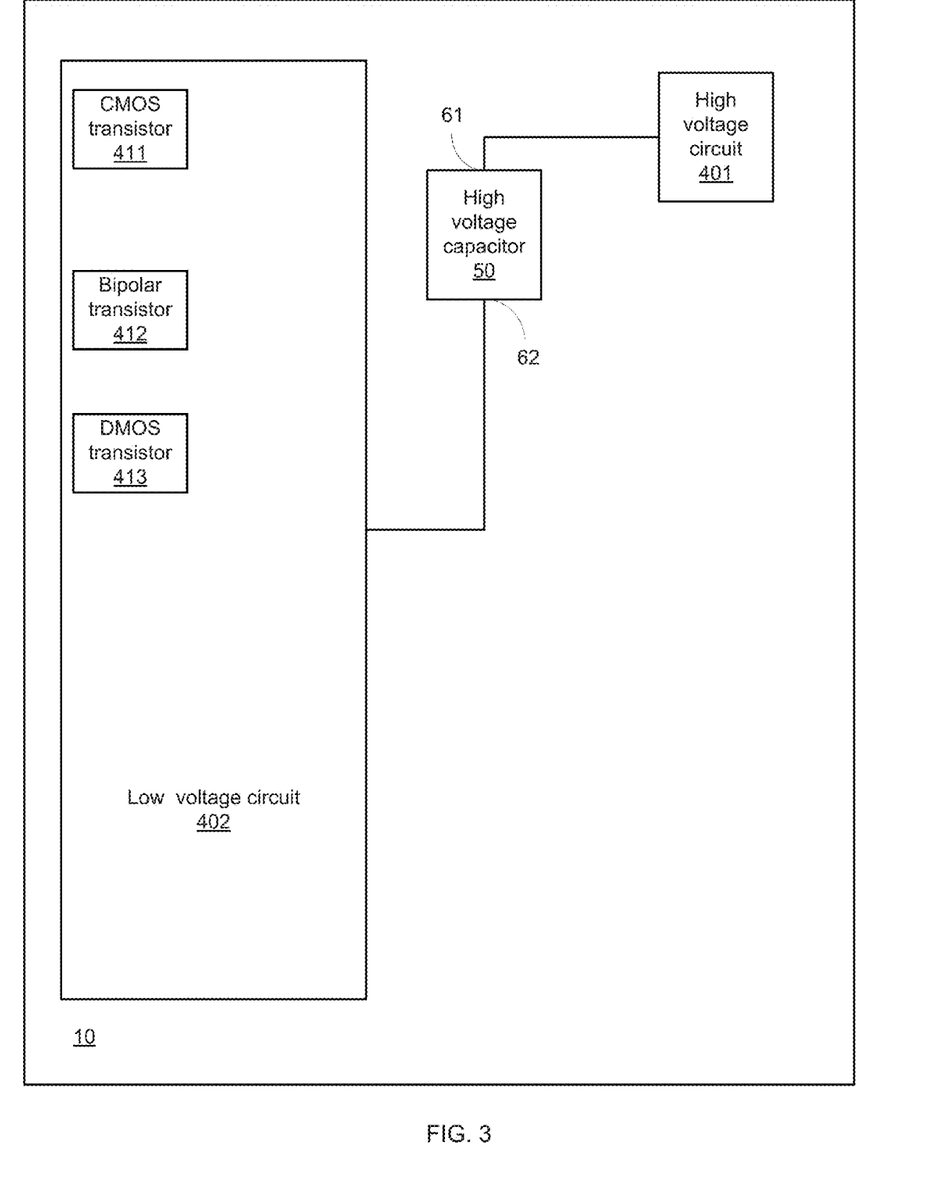
FIG. 3 illustrates a die according to an embodiment of the invention.

FIG. 3 illustrates a die 10 according to an embodiment of the invention.

Die includes high voltage capacitor 50 and is coupled between a high voltage circuit 401 and a low voltage circuit 402 that is illustrated as including a CMOS transistor 411, a bipolar transistor 412 and a DMOS transistor 413. Although die 10 is manufactured using a Bipolar CMOS and DMOS (BCD) manufacturing process—die 10 does not necessarily include all three types of transistors.

Figure 4:
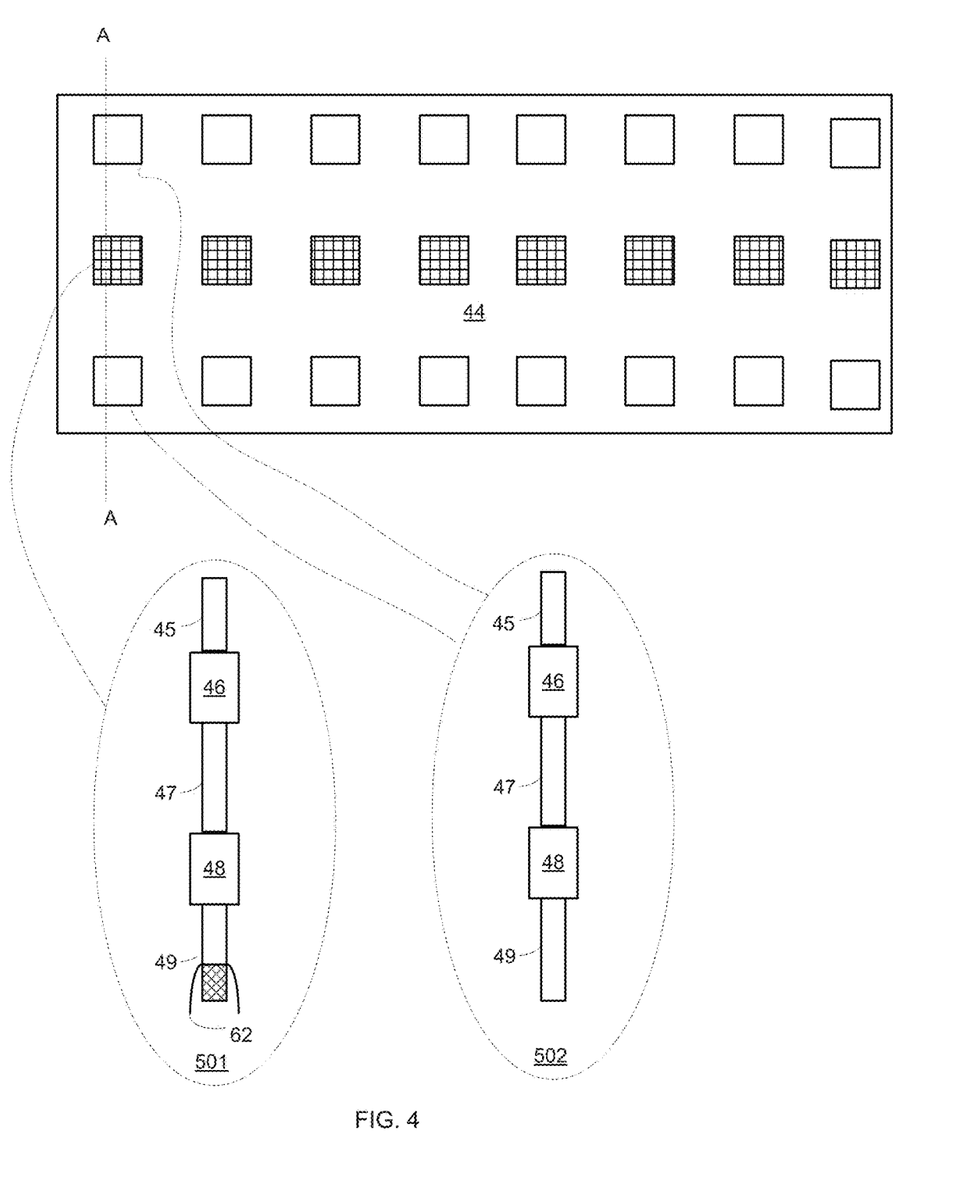
FIG. 4 illustrates a portion of a die according to an embodiment of the invention.

FIG. 4 is a top view of a portion of an intermediate metal layer conductor 44 and of various elements 501 and 502 that are connected to the intermediate metal layer conductor 44 according to an embodiment of the invention.

FIG. 4 also illustrates a plane A-A that corresponds to the cross section plane through which the cross sectional vies of FIGS. 1 and 2 were taken.

FIG. 4 illustrates three rows of elements—corresponding to the three dies and three thin metal conductors per fifth till ninth layers of FIGS. 1 and 2. The two external rows include elements 501 while the internal row includes elements 502.

Each element 501 includes via 45, metal conductor 46, via 47, metal conductor 48, via 49 and transistor 62.

Each element 502 includes via 45, metal conductor 46, via 47, metal conductor 48, and via 49.

Intermediate metal layer conductor 44 supplied power to a group of eight transistors 62 while each one of metal conductors 46 and 48 are connected to a sub-group of transistors that includes up to a single transistor.

Figure 5:
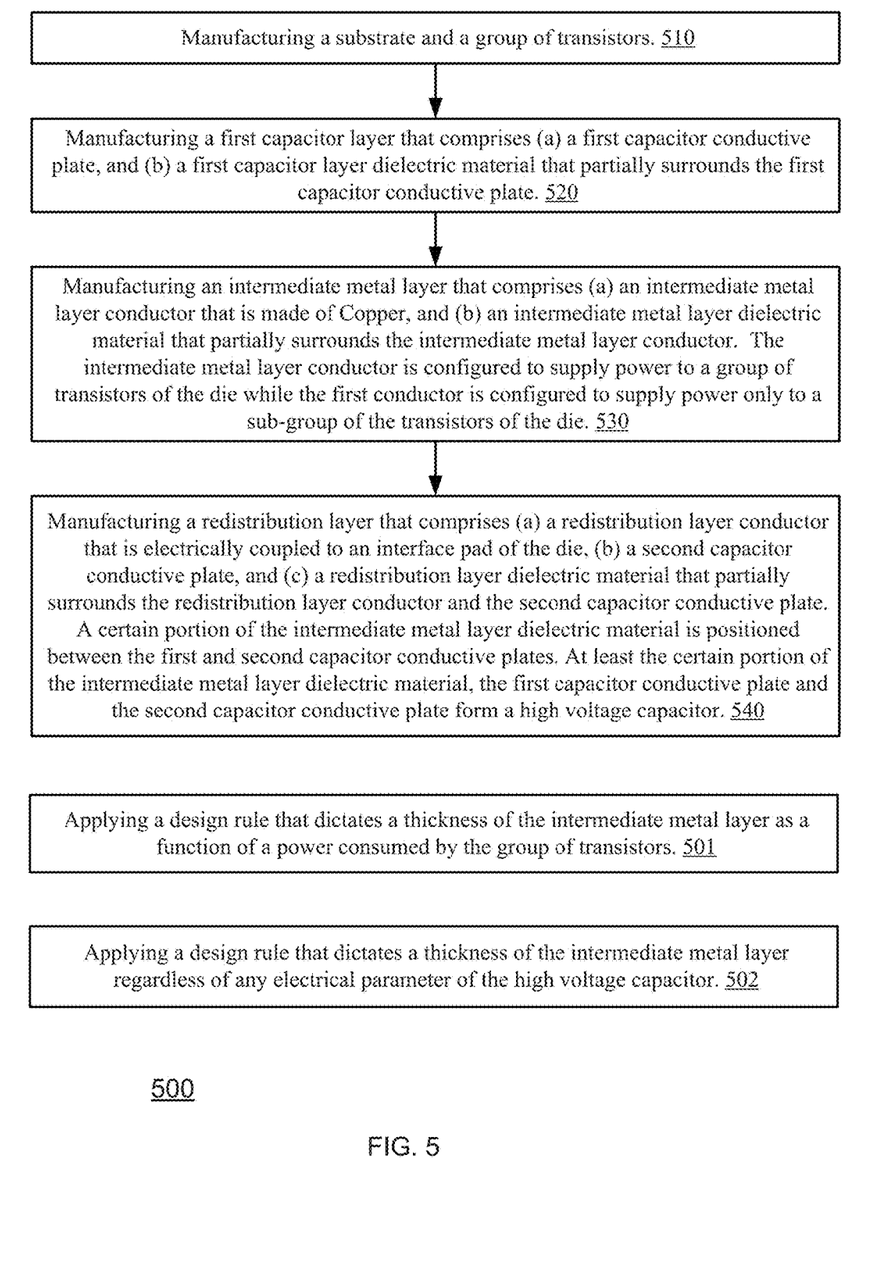
FIG. 5 illustrates a method according to an embodiment of the invention.

FIG. 5 illustrates method 500 according to an embodiment of the invention.

Method 500 may include a sequence of steps that may include steps 510, 520, 530 and 540.

Manufacturing (510) a substrate and a group of transistors.

Manufacturing (520) a first capacitor layer that comprises (a) a first capacitor conductive plate, and (b) a first capacitor layer dielectric material that partially surrounds the first capacitor conductive plate. Step 520 may include manufacturing a first conductor or may be followed by manufacturing the first conductor.

Manufacturing (530) an intermediate metal layer that comprises (a) an intermediate metal layer conductor that is made of Copper, and (b) an intermediate metal layer dielectric material that partially surrounds the intermediate metal layer conductor. The intermediate metal layer conductor is configured to supply power to a group of transistors of the die while the first conductor is configured to supply power only to a sub-group of the transistors of the die.

Manufacturing (540) a redistribution layer that comprises (a) a redistribution layer conductor that is electrically coupled to an interface pad of the die, (b) a second capacitor conductive plate, and (c) a redistribution layer dielectric material that partially surrounds the redistribution layer conductor and the second capacitor conductive plate. A certain portion of the intermediate metal layer dielectric material is positioned between the first and second capacitor conductive plates. At least the certain portion of the intermediate metal layer dielectric material, the first capacitor conductive plate and the second capacitor conductive plate form a high voltage capacitor.

Method 500 may include applying (501) a design rule that dictates a thickness of the intermediate metal layer as a function of a power consumed by the group of transistors.

Method 500 may include applying (502) a design rule that dictates a thickness of the intermediate metal layer regardless of any electrical parameter of the high voltage capacitor.

FIG. 6 illustrates method 600 according to an embodiment of the invention.

Method 600 may include step 610 of designing a die that comprises a first capacitor layer that comprises (a) a first capacitor conductive plate, and (b) a first capacitor layer dielectric material that partially surrounds the first capacitor conductive plate; a first conductor; an intermediate metal layer that comprises (a) an intermediate metal layer conductor that is made of Copper, and (b) an intermediate metal layer dielectric material that partially surrounds the intermediate metal layer conductor; wherein the first conductor is positioned between a substrate of the die and the intermediate metal layer; a redistribution layer that comprises (a) a redistribution layer conductor that is electrically coupled to an interface pad of the die, (b) a second capacitor conductive plate, and (c) a redistribution layer dielectric material that partially surrounds the redistribution layer conductor and the second capacitor conductive plate; wherein a certain portion of the intermediate metal layer dielectric material is positioned between the first and second capacitor conductive plates; wherein at least the certain portion of the intermediate metal layer dielectric material, the first capacitor conductive plate and the second capacitor conductive plate form a high voltage capacitor; and wherein the intermediate metal layer conductor is configured to supply power to a group of transistors of the die while the first conductor is configured to supply power only to a sub-group of the transistors of the die.

Step 610 may include at least one step of step 611 of setting a thickness of the intermediate metal layer regardless of any electrical parameter of the high voltage capacitor; and step 612 of determining the thickness of the intermediate metal layer in response to a power consumed by the group of transistors.

There may be provided a die as illustrated in this application that is designed by method 600 and/or manufactured by method 500.

Any reference to any of the terms "comprise", "comprises", "comprising" "including", "may include" and "includes" may be applied to any of the terms "consists", "consisting", "consisting essentially of". For example—any of the rectifying circuits illustrated in any figure may include more components that those illustrated in the figure, only the components illustrated in the figure or substantially only the components illustrate din the figure.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A die, comprising:
   a first capacitor layer that comprises (a) a first capacitor conductive plate, and (b) a first capacitor layer dielectric material that partially surrounds the first capacitor conductive plate;
   a first conductor;
   an intermediate metal layer that comprises (a) an intermediate metal layer conductor that is made of Copper, and (b) an intermediate metal layer dielectric material that partially surrounds the intermediate metal layer conductor;
   wherein the first conductor is positioned between a substrate of the die and the intermediate metal layer;
   a redistribution layer that comprises (a) a redistribution layer conductor that is electrically coupled to an interface pad of the die, (b) a second capacitor conductive plate, and (c) a redistribution layer dielectric material that partially surrounds the redistribution layer conductor and the second capacitor conductive plate;

wherein a certain portion of the intermediate metal layer dielectric material is positioned between the first and second capacitor conductive plates;

wherein at least the certain portion of the intermediate metal layer dielectric material, the first capacitor conductive plate and the second capacitor conductive plate form a high voltage capacitor;

wherein a ratio between a thickness of the intermediate metal layer and a thickness of the first capacitor layer exceeds three; and wherein the intermediate metal layer conductor is configured to supply power to a group of transistors of the die while the first conductor is configured to supply power only to a sub-group of the transistors of the die.

2. The die according to claim 1 wherein the die comprises complementary metal oxide transistors, bipolar transistor and double diffused metal oxide transistors.

3. The die according to claim 1 wherein the first capacitor layer is a first metal layer; wherein the first capacitor conductive plate is made of metal; and wherein the first capacitor layer dielectric material partially surrounds the first conductor.

4. The die according to claim 1 wherein the first capacitor layer is positioned between the substrate of the die and the first conductor and wherein the first capacitor conductive plate comprises a non-metal conductive material.

5. The die according to claim 4 wherein the non-metal conductive material is silicide.

6. The die according to claim 1 wherein a thickness of the intermediate metal layer exceeds 30000 Angstrom.

* * * * *